March 11, 1969  J. J. TOWNSLEY ET AL  3,432,106
MAGNETICALLY CONTROLLED FLUID INJECTOR
Filed Jan. 31, 1967

INVENTORS
MILTON GERSHON
JOHN J. TOWNSLEY
BY Thomas W. Brennan

United States Patent Office 3,432,106
Patented Mar. 11, 1969

3,432,106
MAGNETICALLY CONTROLLED
FLUID INJECTOR
John J. Townsley, Parsippany, and Milton Gershon, Morristown, N.J., assignors to Thiokol Chemical Corporation, Bristol, Pa., a corporation of Delaware
Filed Jan. 31, 1967, Ser. No. 612,842
U.S. Cl. 239—585
Int. Cl. B05b 1/32; B64d 33/04; F16k 31/06
5 Claims

ABSTRACT OF THE DISCLOSURE

Valve mechanisms including a flexible plate or a slidable plug for covering an injection orifice, the position of the plate or the plug with respect to the orifice being controlled by a slidable magnet, which can be of the permanent type or an electromagnet, and additionally by varying the energizing current in the electromagnet which can be fixed instead of slidable.

---

The present invention relates to a fluid injection apparatus for injecting fuel and oxidizer into a rocket motor combustion chamber and, more particularly, to magnetically controlled means for controlling the flow of fluid through the injection orifices.

In any propulsion system employing liquid propellants, the problem of controlling the propellants in proper proportions is ever present. Various mechanisms, for example, mechanical valves, piston devices, annular pintles, etc. have been utilized for accomplishing such control with varying degrees of success. Among the considerations in the selection of a suitable mechanism are weight, simplicity, number of moving parts, sealing in of the liquids and ability to operate in a high temperature environment.

It is therefore an object of the present invention to provide a fluid control mechanism which is relatively light, mechanically simple, has a minimum of moving parts and is capable of operation in the injection apparatus of a rocket motor.

Another object is the provision of means which are operable to throttle the injector for metering the flow of fluid through the injection orifices.

A further object is to provide means for controlling fluid injection, which means may be programmed for desired operation of the injection apparatus.

Other objects, advantages and features of the invention will become more fully apparent from consideration of the following specification when considered in connection with the accompanying drawings in which.

Figure 1:
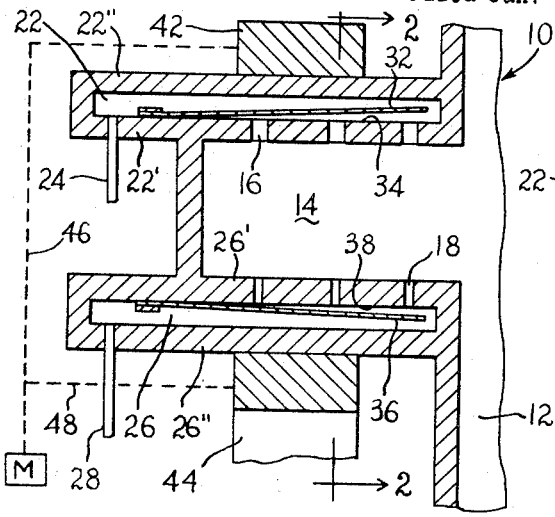
FIGURE 1 is a fragmentary sectional view of a portion of a rocket motor which view schematically illustrates the relationship of the parts and is taken generally along line 1—1 of FIGURE 2.
Figure 2:
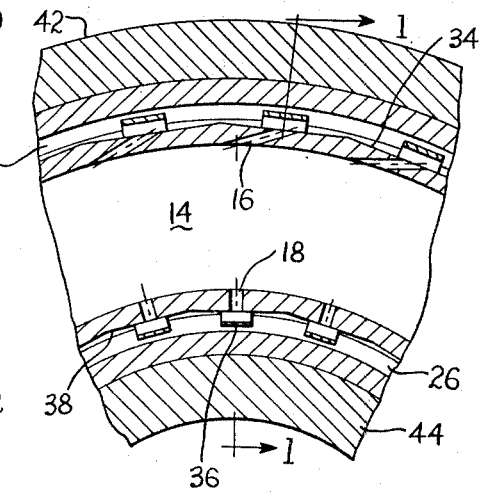
FIGURE 2 is a fragmentary sectional view taken generally along line 2—2 of FIGURE 1.

Referring now to the drawings wherein like reference characters designate like or corresponding parts throughout the several views, there is shown in FIGURE 1 a fragmentary sectional view of a rocket motor, designated generally by reference numeral 10 and comprising a combustion chamber 12 and a vortex injection chamber 14 into which liquid propellants flow through a plurality of injection orifices or ports 16 and 18. Orifices 16 are in communication with an annular supply chamber 22 which is connected with a source of supply (not shown) by way of a suitable conduit 24, ports 18 being similarly related to an annular supply chamber 26 supplied by a conduit 28.

Flow of fluid through orifices 16 is controlled by a plurality of elongated flat valve plates or reeds 32 of flexible material which are adapted to seat against flat surfaces 34 provided in the inner annular wall 22' of chamber 22. Similarly flexible valve plates or reeds 36 seat on flattened portions 38 of wall 26' of chamber 26 for control of fluid through orifices or ports 18. Flexure of the plates 32 is effected by magnetic means in the form of a permanent magnet 42, annular in form and slidably mounted on chamber 22, the walls 22' and 22'' of which are of a suitable nonmagnetic material, such as certain types of stainless steel, the plates 32 being of suitable magnetic material and attracted to the magnet. Similarly, an annular permanent magnet 44 is mounted for sliding movement relative to chamber 26, the walls 26' and 26'' of which are of stainless steel or other suitable nonmagnetic material, plates 36 being of suitable magnetic material and attracted to magnet 44, whereby positioning of the magnet controls the flexing of the plates and flow of fluid through orifices 18. Magnets 42 and 44 are connected by suitable linkages 46 and 48 to suitable actuating mechanism M for moving the magnets to obtain necessary positioning of the plates 32 and 36 for desired flow of the liquid propellants, for example, fuel and oxidizer in the proper proportionate amounts.

Figure 3:
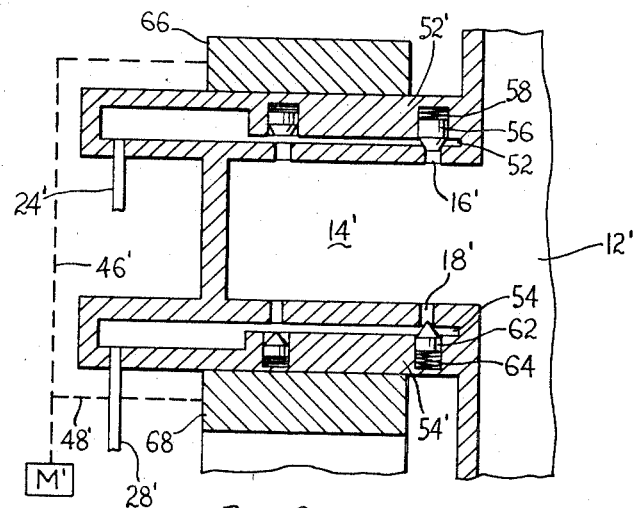
FIGURE 3 is a view similar to FIGURE 1 but showing a modified form of orifice flow control means.

Turning now to FIGURE 3, there is shown a portion of a rocket motor comprising a combustion chamber 12', and an injection chamber 14' into which liquid propellants flow through orifices or ports 16' and 18'. Ports 16' communicate the injection chamber with an annular supply chamber 52 receiving liquid propellant from a source of supply (not shown) via a conduit 24', ports 18' serving the same purpose with respect to an annular supply chamber 54 supplied via a conduit 28'.

Flow through orifices or ports 16' is controlled by a plurality of valve pistons or plugs 56 mounted for sliding movement in suitable bores formed in wall 52' of chamber 52 there being a plug associated with each of the ports, respectively, and a spring 58 urging the plug into a position closing off flow through the respective port. Similarly, flow through ports 18' is controlled by valve pistons or plugs 62 slidably mounted in wall 54' of chamber 54 and urged to closing position by springs 64. The ports are uncovered by retraction of the valve plugs under the influence of annular permanent magnets 66 and 68, the former controlling the positions of plugs 56 and the latter the positions of plugs 62. The walls of the supply chambers 52 and 54 are of a suitable nonmagnetic material, for example, certain types of stainless steel or the like, and the plugs are of a suitable magnetic material. Magnets 66 and 68 are connected by suitable linkages 46' and 48' to an actuating mechanism M' for moving the magnets and changing the spatial relationship of the same with respect to the plugs to effect retraction or permit the plugs to close off the ports under the influence of the respective springs.

Figure 5:
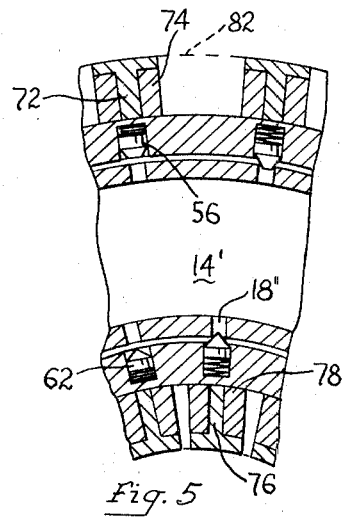
FIGURE 5 is a sectional view similar to FIGURE 2 but illustrating the modification of FIGURE 4.
Figures 4, 6, 7:
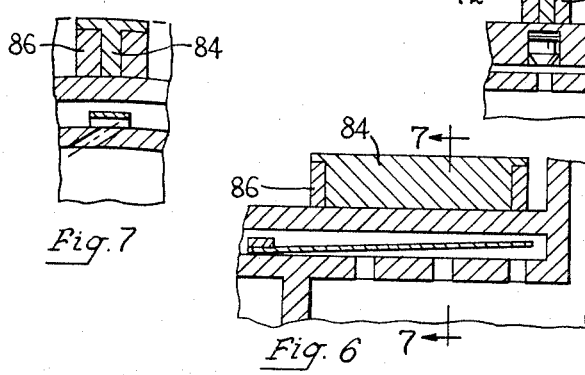
FIGURE 4 is a sectional view similar to FIGURE 3 with portions thereof omitted and showing a different form of magnetic control means.
FIGURE 6 is a sectional view similar to FIGURE 1 with portions thereof omitted and showing a different form of mangetic control means.
FIGURE 7 is a sectional view taken generally along line 7—7 of FIGURE 6.

Permanent magnets 66 and 68 can be replaced with electromagnets. FIGURE 4 showing one manner of relating a cylindrical magnet pole 72 and its magnet coil 74 to its associated plug 56, FIGURE 5 also showing the relationship between plugs 62 and electromagnets comprising cylindrical magnet poles 76 and magnet coils 78. If desired, the magnet poles 72 may be interconnected by a ring or shell of ferromagnetic material, shown in dotted lines in FIGURE 5 and designated by reference numeral 82. Magnet poles 76 can be similarly interconnected.

Electromagnets can be employed in place of permanent magnets 42 and 44 of FIGURE 1 and may comprise a plurality of cylindrical pole magnets, such as those designated by reference numerals 72 and 76, or the electromagnets can be elongated in form as shown in FIGURES 6 and 7, in which note magnet pole 84 and its magnet coil 86. Magnet poles 84 can be interconnected by a ring or shell similar to ring or shell 82 and can be fixed in placed or slidably mounted.

While the magnets have been disclosed as effecting a retraction of the plates or plugs, it will be appreciated that they could be utilized instead to effect the full or partial closing of normally open orifices, and plates 32 and 36 could be oppositely secured. It is therefore, to be understood that the sizes of the injection orifices are chosen and that the various magnetic elements are made to possess parameters and characteristics and properly poled to effect desired positioning of the plates or plugs for obtaining the proper proportionate flow of liquid propellants through the injection ports or orifices; and that the actuating means for the permanent magnets or the current for the magnet coils can be programmed to this end.

There has thus been provided a magnetically controlled fluid injector which accomplishes the objects of the invention.

Obviously, many modifications and variations of the present invention are possible in light of the above teachings. It is therefore to be understood that within the scope of the appended claims the invention may be practiced otherwise than as specifically described.

What is claimed is:

1. An injector for a liquid propellant rocket motor, said motor having a combustion chamber comprising:
   at least one pair of radially spaced apart nonmagnetizable annular walls, said walls being structurally interconnected to define an annular fluid supply chamber therebetween, a first one of said walls of said pair having a plurality of fluid passages through said wall to provide fluid communication between said supply chamber and said combustion chamber;
   at least one annular magnet slidably contacting the other wall of said pair of walls;
   actuating means for causing said magnets to slide on said other wall;
   magnetizable and flexible valve means in said annular fluid chamber for controlling fluid flow through said passages in response to the magnetic force of said sliding magnet; and,
   means for conducting fluid from an external source to said fluid chamber.

2. The invention of claim 1 wherein the magnetizable and flexible valve means is a plurality of elongated plates each fixed at one end to one of said walls and extending therefrom in fluid controlling relationship with at least one fluid passage.

3. The invention of claim 1 wherein the magnetizable and flexible valve means is a plurality of slidable plugs each positioned on a spring for slidably moving said plug in a direction opposing said magnetic force of said magnet; and said other wall is formed with a plurality of bores for slidably retaining said plugs in fluid controlling relationship with said passages.

4. The invention of claim 1 wherein the annular magnet is a permanent magnet.

5. The invention of claim 1 wherein the annular magnet is an electromagnet.

References Cited
UNITED STATES PATENTS

| | | | |
|---|---|---|---|
| 2,629,401 | 2/1953 | Miller | 251—65 XR |
| 2,881,980 | 4/1959 | Beck et al. | 239—585 XR |
| 3,134,404 | 5/1964 | Ziccardi | 251—65 XR |
| 3,288,379 | 11/1966 | Croft et al. | 239—585 |

FOREIGN PATENTS

| | | |
|---|---|---|
| 951,177 | 3/1964 | Great Britain. |

EVERETT W. KIRBY, *Primary Examiner.*

U.S. Cl. X.R.

239—265.11; 251—65